A. W. REISER.
CHANDELIER CLUSTER HOOK.
APPLICATION FILED JULY 27, 1917.

Patented Feb. 5, 1918.

INVENTOR
Alfred W. Reiser
BY Harry Lea Dodson
ATTORNEY

A. W. REISER.
CHANDELIER CLUSTER HOOK.
APPLICATION FILED JULY 27, 1917.

1,255,639.

Patented Feb. 5, 1918.
2 SHEETS—SHEET 2.

INVENTOR
Alfred W. Reiser
BY Harry Lea Dodson.
ATTORNEY

UNITED STATES PATENT OFFICE.

ALFRED W. REISER, OF TOLEDO, OHIO, ASSIGNOR TO THE WESTERN GAS FIXTURE CO., OF TOLEDO, OHIO, A CORPORATION OF OHIO.

CHANDELIER CLUSTER-HOOK.

1,255,639.     Specification of Letters Patent.     Patented Feb. 5, 1918.

Application filed July 27, 1917. Serial No. 183,127.

*To all whom it may concern:*

Be it known that I, ALFRED W. REISER, a citizen of the United States, residing at Toledo, in the county of Lucas and State of Ohio, have invented a certain new and useful Chandelier Cluster-Hook, of which the following is a specification.

My invention is designed to improve the means which are employed in the suspension of chandeliers or bowls from the ceiling outlet.

Prior to my invention or discovery it has been customary to secure the hooks from which the chains or other supporting members of a chandelier, shower pan or bowl are suspended, by drilling or punching holes in the canopy, and inserting a threaded eye or hook therein, with a lock nut placed on the inside of the canopy to hold the hook.

It is apparent that in this type of construction, the thin metal forming the walls of the canopy was all the support which was afforded for the fixture. The work of preparing canopies for this purpose was expensive, tedious and besides that afforded an insecure support. Furthermore, it is frequently the custom to support the canopy by means of a small ball threaded upon a pipe, extending from the nipple in the center of the outlet or the junction box, and this was the only thing that prevented the canopy from being drawn down or crushed in by the weight of the fixture, which frequently occurred, resulting in, if not dropping the fixture, its hanging improperly.

My invention has for its object to provide an absolutely new means of suspending chains or other supporting members from a canopy, and one which can be manufactured economically and which will greatly facilitate the installation of fixtures.

My means of accomplishing the foregoing objects may be more readily understood by having reference to the accompanying drawing, which is hereunto annexed and is a part of this specification, in which.

Similar reference numerals refer to similar parts throughout the entire description.

Figure 1:
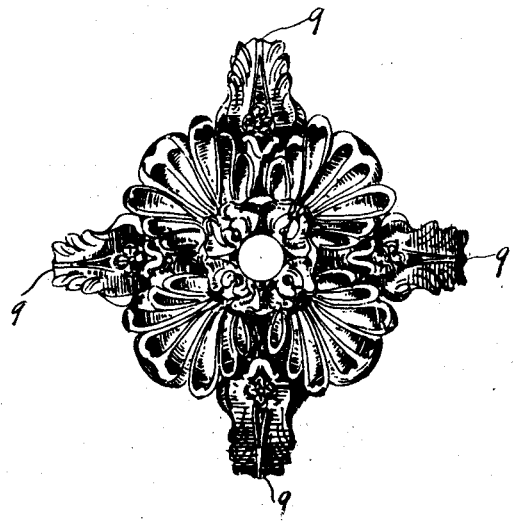
Figure 1 is a bottom or plan view of a cluster hook constructed in accordance with my improved device.
Figure 2:
Fig. 2 is a side elevation of the same.

As shown in the drawings, the outlet or junction box 1, is indicated by dotted lines, to the center of which is secured a pipe or nipple 2, surrounding which is a canopy 3, of the usual form, the nipple 2, being provided with threads 4 at its lower extremity, which are engaged by a lock nut 5, of any suitable construction. My improved cluster hook 6, is provided with a central opening 7, adapted to permit the passage therethrough at the lower end of the nipple 2. It is formed with a curved inner surface 8, which is similar to the curve of the standard canopy, although it can be varied to suit any particular kind of canopy, if desired, the whole forming a cup-shaped arrangement, which is provided with a plurality of hooks 9, at its upper periphery, which are adapted to engage links 10, which lead to the supports 11, which carry the chandelier, shower pan or bowl, as the case may be.

It will be obvious from the foregoing description that by the use of this invention, the entire strain is carried, not by the canopy, which is, as a rule, formed of extremely light or thin brass, but is carried by the nipple 2, which is formed of substantial material and screw threaded into the junction box or tripod and the lock nut 5, at its lower end, holds the cluster hook securely in position, without in any way depending upon the canopy to support the chains 10.

Figure 3:
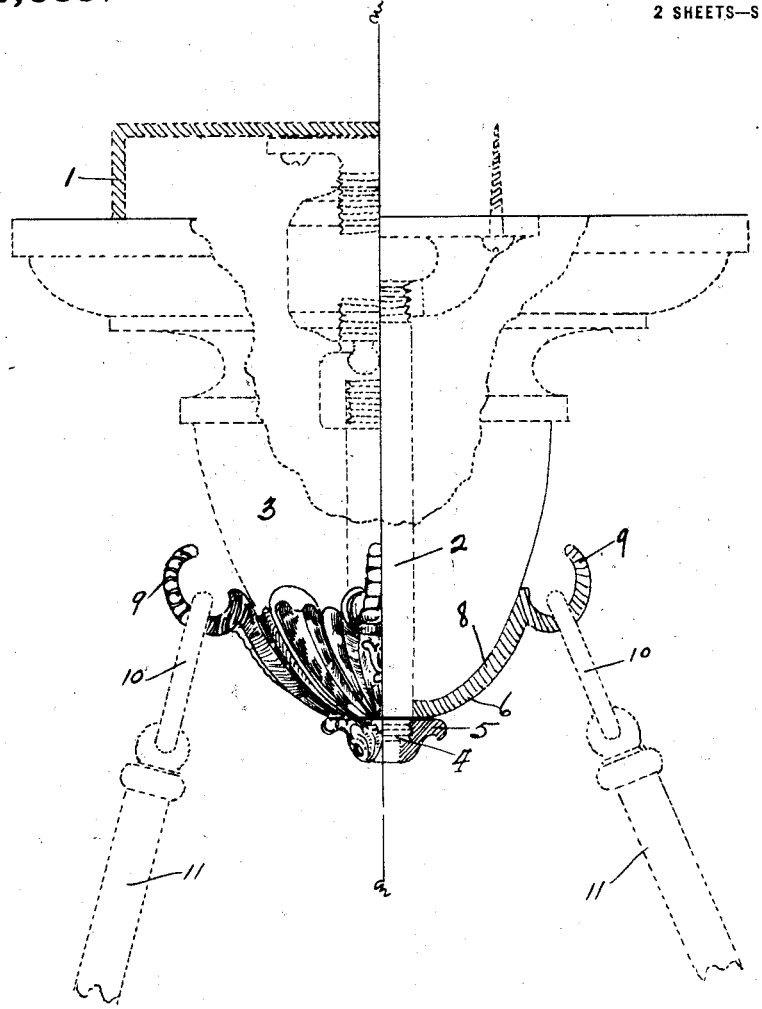
Fig. 3 is a side view partially in section showing the device in use.

The result of this construction is to greatly simplify the installation of the fixture as it is possible to run the wires down through the pipe or nipple 2, before the canopy is placed in position, and then the canopy can be properly located and the cluster hook mounted in its proper location, the lock nut 5 tightened into position, operating to securely hold the device in place. It will be apparent from the foregoing description to those skilled in the art that a canopy is not a necessary part of my invention and in fact the entire canopy could be omitted, or the nipple 2 could be extended down sufficiently far so as to provide a support for the cluster hook at a much greater distance from the ceiling than is shown in Fig. 3, and although I have shown a specific design for this device, I do not wish to be understood as limiting myself to the particular design or shape, as an infinite number of designs can be applied to my invention without deviating from the spirit and scope as described in the hereinafter contained claims.

Although I have described my invention as being provided with a central opening and secured to the pipe or nipple 2, by means of a lock nut, it will be obvious to persons skilled in the art, that it may be cast with a downwardly depending portion, which can be cored and provided with internal threads fitting to the threads formed upon the end of the nipple.

Having described my invention what I regard as new and desire to secure by Letters Patent is:

1. A device of the character described, comprising a cup shaped member provided with a central opening at its lower portion and a plurality of hooks at its periphery adjacent the top of the cup shaped portion.

2. A device of the character described, comprising a cup shaped member provided with a central opening at its lower portion the upper part of the wall forming a plurality of hooks.

3. The combination with a junction box, of a canopy, a chandelier cluster hook comprising a cup shaped member having a plurality of hooks formed as a part of the wall thereof, means carried by the junction box to support said chandelier cluster hook, and in turn said canopy.

4. In combination an outlet box and tripod, a pipe depending therefrom, a chandelier cluster hook comprising a member having a plurality of hooks at its periphery, there being a central opening in said member.

5. In combination, an outlet box and a pipe depending therefrom, a chandelier cluster hook comprising a member having a plurality of hooks at its periphery, there being a central opening in said member, and means to secure said chandelier cluster hook upon said pipe.

6. A device of the character described comprising a cup shaped member provided with a central opening at its lower portion, the walls of said member forming a plurality of hooks.

7. A device of the character described comprising a cup shaped member provided with a central opening at its lower portion and a plurality of hooks at its periphery adjacent the top of the cup shaped portion, said hooks being formed integral with said cup shaped member.

In testimony whereof I have signed the foregoing specification.

ALFRED W. REISER.

Copies of this patent may be obtained for five cents each, by addressing the "Commissioner of Patents, Washington, D. C."